United States Patent
Widegren et al.

(10) Patent No.: US 6,374,112 B1
(45) Date of Patent: Apr. 16, 2002

(54) FLEXIBLE RADIO ACCESS AND RESOURCE ALLOCATION IN A UNIVERSAL MOBILE TELEPHONE SYSTEM

(75) Inventors: Ina Widegren; Per H. A. Willars, both of Stockholm; Bo S. P. Wallentin, Ljungsbro, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/283,248

(22) Filed: Apr. 1, 1999

Related U.S. Application Data

(60) Provisional application No. 60/080,548, filed on Apr. 3, 1998.

(51) Int. Cl.[7] ................................................ H04Q 7/20
(52) U.S. Cl. ...................... 455/452; 455/63; 455/67.1; 455/426; 455/453; 455/509; 455/511; 370/352; 370/353
(58) Field of Search ................................ 455/452, 453, 455/451, 426, 442, 509, 511, 63, 67.1; 370/329, 331, 335, 341, 342, 352, 353

(56) References Cited

U.S. PATENT DOCUMENTS

| | | | |
|---|---|---|---|
| 5,666,348 A | 9/1997 | Thornberg et al. | |
| 5,673,259 A | 9/1997 | Quick, Jr. | |

FOREIGN PATENT DOCUMENTS

| | | |
|---|---|---|
| GB | 2 301 992 | 12/1996 |
| WO | 96/34504 | 10/1996 |
| WO | 96/37081 A | 11/1996 |
| WO | 98/03030 | 1/1998 |
| WO | 98/24250 A | 6/1998 |

OTHER PUBLICATIONS

*IEEE Communications*, vol. 15, No. 8, Oct. 1997, pp. 1477–1486, Ermanno Berruto, "Architectural Aspects for the Evolution of Mobile Communications Toward UMTS".

(List continued on next page.)

*Primary Examiner*—Lee Nguyen
(74) *Attorney, Agent, or Firm*—Nixon & Vanderhye P.C.

(57) ABSTRACT

The present invention provides flexible radio access and resource allocation in a Universal Mobile Telephone System (UMTS). A UMTS Terrestrial access network (UTRAN) in response to a radio access bearer service request, flexibly and efficiently allocates resources necessary to support a communication with a mobile radio. The UTRAN includes plural base stations for communicating with mobile radios over a radio/air interface using radio channel resources allocated by a radio network controller connected to the base stations. External network service nodes interfacing with external networks communicate with the UTRAN over a radio access network interface. The UTRAN provides a radio access bearer service to the external network service nodes, and radio access bearers are dynamically assigned to radio channel resources by the UTRAN. When establishing each bearer, the UTRAN flexibly maps or allocates the radio access bearer to physical transport resources through the UTRAN and radio channel resources over the radio/air interface. In an example embodiment, the transport between nodes and the UTRAN includes an ATM connection, and a radio channel over the air interface includes one or more CDMA spreading codes. The mapping is based on one or more parameters including for example one or more quality of service parameters and/or current traffic conditions. In addition, if the one or more parameters changes during the life of the connection, the connection may be switched to a more appropriate channel type.

43 Claims, 9 Drawing Sheets

OTHER PUBLICATIONS 1993 43$^{rd}$ IEEE Vehicular Technology Conference, Meadowlands Hilton, Secaucus, NJ, USA, May 18–20, 1993, pp. 520–523, Ermanno Berruto et al., "Variable–Rate for the Best Speech Service in UMTS".

XVI World Telecom Congress Proceedings, ISS '97, Sep. 21, 1997, pp. 339–345, Andreas Schieder et al., "GRAN[1]—A New Concept for Wireless Access in UMTS".

TI00034U–VII—Lauri Söderbacka, pp. 1–10, "UMTS Network Architecture".

IFIP Workshop TC6, Jul. 2, 1995, pp. 34/1–34/10, XP002085769, Bradford (GB), Z. Fan et al., "ATM Traffic Prediction Using FIR Neural Networks".

IEEE Network: The Magazine of Computer Communications, vol. 9, No. 4, Jul 1, 1995, pp. 34–45, XP000526590, Cui–Qing Yang et al., "A Taxonomy for Congestion Control Algorithms in Packet Switching Networks".

FLEXIBLE RADIO ACCESS AND RESOURCE ALLOCATION IN A UNIVERSAL MOBILE TELEPHONE SYSTEM

This application claims the benefit of U.S. Provisional Application No. 60/080,548, filed Apr. 3, 1998.

FIELD OF THE INVENTION

The present invention relates in general to mobile communications, and in particular, to flexibly providing a wide variety of mobile communications services and efficiently allocating resources to support those services.

BACKGROUND OF THE INVENTION

Mobile communications have developed from first generation, analog-based mobile radio systems to second generation digital systems, such as the European Global System for Mobile communications (GSM). Current developments for a third generation of mobile radio communication include the Universal Mobile Telephone communications System (UMTS) and the IMT 2000 system. For simplicity, third generation systems are referred to simply as UMTS. In simple terms, UMTS is "communication to everyone, everywhere," where communication also includes the provision of information using different types of media, i.e., multimedia communications.

From the user's perspective, there should be no distinction in service capability between mobile or fixed network access. Because of the widespread success of the existing GSM platform, i.e., a global "GSM footprint," as well as the inherent upgradability and modularity of the GSM platform, there is a strong impetus to base UMTS on an "evolved" GSM platform. In fact, the present invention describes a UMTS based on an evolved GSM platform and therefore uses GSM terminology. Of course, those skilled in the art will recognize that the principles of the present invention are not limited to a GSM platform/terminology and may be implemented using other appropriate platforms.

Current mobile/cellular telecommunications networks are typically designed to connect and function with Public Switched Telephone Networks (PSTNs) and Integrated Services Digital Networks (ISDNs). Both of these networks are circuit-switched networks (rather than packet-switched) and handle relatively narrow bandwidth traffic. However, packet-switched networks, such as the Internet, are very much in demand and handle much wider bandwidth traffic than circuit-switched networks. While wireline communication terminals, e.g., personal computers, are capable of utilizing the wider packet-switched network bandwidth, wireless mobile radio terminals are at a considerable disadvantage because of the limited bandwidth of the radio/air interface that separates the mobile terminals from packet-switched networks.

Mobile terminals are currently limited in the data rates for data communications services such as facsimile, electronic mail, and Internet. While it is feasible perhaps to provide some slow-scan video and picture transfer at this limited rate over the radio air interface at this limited rate, as long as demands on quality are not too high, the expectations regarding real time use of the Internet are a more difficult challenge. The demand is growing for higher data transfer speeds in order the "surf the net" using mobile terminals with fast access to text, images, and sound. This multimedia application demands high peak bit rates in short bursts while the information is downloaded to the mobile terminal. Another challenging multimedia, mobile terminal application is simultaneous voice and data, e.g., PC application sharing or shared whiteboard. Although this latter type of multimedia application does not require particularly high bit rates, it does require real time, continuous operation because of the voice content. A demanding circuit-switched application (rather than packet-switched as in the Internet application) requiring relatively high bit rates is video conferencing. In order for mobile video conferencing to become practical, the amount of user bandwidth required must be reduced to a minimum without sacrificing image quality.

GSM already meets some of the requirements for UMTS. For example, two new service classes are under development for GSM to expand the current user data rate: High Speed Circuit Switched Data (HSCSD) and General Packet Radio Service (GPRS). Both services are designed to integrate with the current GSM system. HSCSD bearer services bundle up eight Time Division Multiple Access (TDMA) time slots within a 200 kHz GSM carrier to create a higher bandwidth channel. In other words, a 64 kbps circuit switched bearer channel uses all available TDMA slots. HSCSD is also being developed to provide bandwidth on demand at variable data rates. GPRS is a packet switching technique that employs reduced channel coding to achieve a net bit rate of 14.4 kbps per time slot providing a maximum throughput rate of 115 kbps. It is more suited to handling "bursty" traffic such as the infrequent transmission of e-mail messages, Internet information, and other data. Because GPRS is a packet switching service, it only requires a channel when data is being sent thereby enabling the frequency spectrum to be more efficiently allocated across voice and data calls and allowing channels to be shared between several users simultaneously.

However, one area of weakness for GSM is narrowband radio access. A UMTS Wideband-Code Division Multiple Access (WCDMA) radio access network provides wireless access at very high data rates and supports enhanced bearer services not realistically attainable with the first and second generation mobile communication systems. WCDMA currently supports 5 MHz–15 MHz, and in the future, promises an even greater bandwidth. In addition to wide bandwidth, WCDMA also improves the quality of service by providing robust operation in fading environments and transparent ("soft") handoffs between base stations. Multiplath fading is used to advantage to enhance quality, i.e., using a RAKE receiver and improved signal processing techniques, contrasted in narrowband systems where fading substantially degrades signal quality.

In the present invention, a UMTS Terrestrial Radio Access Network (UTRAN) responds to radio access bearer service requests with flexible and efficient allocation of resources needed to support a communication with a mobile radio. The UTRAN includes plural base stations for communicating with mobile radios over a radio air interface using radio channel resources allocated by a radio network controller connected to the base stations. External network service nodes that interface with external networks communicate with mobiles via the UTRAN. When one of the service nodes requires communication with a mobile radio, the service node requests a radio access bearer from the UTRAN rather than a specific radio channel resource. A radio access bearer is a logical connection with the mobile station through the UTRAN and over the radio air interface and corresponds to a single data stream. For example, one radio access bearer may support a speech connection, another bearer may support a video connection, and a third bearer may support a data packet connection. Each radio access bearer is associated with quality of service (QoS) parameters describing how the UTRAN should handle the data stream. Examples of quality of service parameters include data rate, variability of data rate, amount and variability of delay, guaranteed vs. best effort delivery, error rate, etc.

The radio access bearers are dynamically assigned to UTRAN transport and radio channel resources by the UTRAN. The radio access bearer service and the UTRAN isolate the details of transport and radio resource allocation handling as well as details of radio control, e.g., soft handoff. The UTRAN approach is different from traditional approaches where an external network and/or an external network service node is involved in the details of requesting, allocating, and controlling specific radio connections to and from the mobile radio. Instead, the external network service node only needs to request a radio access bearer service over a RAN interface to the UTRAN along with a specific quality of service for a communication to a specific mobile radio. The UTRAN provides the requested service at the requested quality of service (if possible).

Plural radio access bearers may be established and released independently to one mobile radio including bearers from different networks. Moreover, plural radio access bearers, e.g., one carrying circuit-switched information and another carrying packet-switched information, intended for the specific mobile radio may be multiplexed onto the same CDMA channel. Each bearer may have its own Asynchronous Transfer Mode (ATM) transport connection through the UTRAN, or it may be multiplexed with other bearers onto one ATM transport connection.

To initiate a radio access bearer service, a request is transmitted to the UTRAN for communication with a mobile radio. One or more parameters accompany the radio access bearer service request. When establishing each bearer, the UTRAN flexibly "maps" or allocates the radio access bearer to physical transport and radio channel resources through the UTRAN and over the radio air interface, respectively. The transport connection between nodes in the UTRAN in a preferred example embodiment is an ATM type connection. A radio channel over the air interface includes one or more CDMA spreading codes.

The mapping is based on the one or more parameters associated with the radio access bearer service request. In addition to quality of service parameters, the parameters may also include one or more traffic condition parameters like a congestion level on a common channel, an interference level in the geographic location area in which the mobile radio is currently operating, a distance between the mobile radio and the base station, radio transmit power, the availability of dedicated channel resources, the existence of a dedicated channel to a mobile station, and other traffic parameters or conditions.

In the example embodiment, two different types of radio channels are provided. A dedicated type of channel delivers frames of information as received without substantial delay. A common or shared type of channel delivers packets of information in a scheduled manner. When the quality of service parameter(s) requested is (are) relatively high, e.g., for a speech or a synchronized communication, soft/softer handover, etc., the dedicated channel may for example be selected. When the quality of service requested is relatively low, e.g., for an e-mail message, the common channel may for example be selected.

As mentioned above, the channel type selection may also take into account traffic parameters like the interference level in the geographic location area in which the mobile radio is currently operating. If that interference level is high, a dedicated radio channel may for example be selected which typically includes mobile transmit power control to help reduce the interference level. When the interference level is low, the shared radio channel may for example be selected to available more dedicated channel resources for other connections. Indeed, if the availability of dedicated channels is low, the dedicated radio channel may be selected. Although, the channel type selection may be based on one parameter, e.g., one quality of service parameter, it is preferably based on plural quality of service parameters associated with the connection, or on a quality of service parameter associated with a connection and a current traffic condition, like the interference level in the mobile's geographic location area.

On the other hand, if dedicated channel already exists between the UTRAN and the mobile radio, a new logical connection is mapped to the already-existing dedicated channel since the UTRAN can multiplex different logical connections associated with the mobile station onto the single dedicated channel. Similarly, control signaling associated with the logical connection, while generally transferred on the common channel, is transferred on a dedicated channel if one exists to the mobile station.

In addition to initially selecting one of plural radio channel types when a connection associated with a radio access request is initially established by the UTRAN, one or more parameter values relating to quality of service, traffic conditions, etc. is monitored during the lifetime of the connection. If the monitored parameter(s) changes enough from what was initially determined when the channel type for the connection was selected, the connection may be switched to another type of radio channel. For example, if a common radio channel is established for the connection based on an initial quality of service value, and the quality of service associated with that connection subsequently increases (preferably by a certain threshold amount over the initial quality of service value), the connection may be switched to a dedicated radio channel. Alternatively, if the quality of service associated with the connection subsequently decreases when a dedicated channel was initially established, the connection may be switched to the common radio channel. In another example, even though the common radio channel was initially established for a connection, the interference level in the cell may subsequently may have increased such that it warrants switching the connection to a dedicated radio channel in order to decrease the interference level in the cell.

BRIEF DESCRIPTION OF THE DRAWINGS

These and other objects, features, and advantages of the present invention will now be described in conjunction with the drawings in which.

DETAILED DESCRIPTION OF THE DRAWINGS

In the following description, for purposes of explanation and not limitation, specific details are set forth, such as particular embodiments, data flows, signaling implementations, interfaces, techniques, etc. in order to provide a thorough understanding of the present invention. However, it will be apparent to one skilled in the art that the present invention may be practiced in other embodiments that depart from these specific details. For example, while the present invention is described in the context of an example cellular telephone network using GSM terminology, those skilled in the art will appreciate that the present invention can be implemented in any cellular telephone system. In other instances, detailed descriptions of well-known methods, interfaces, devices, and signaling techniques are omitted so as not to obscure the description of the present invention with unnecessary detail.

Figure 1:
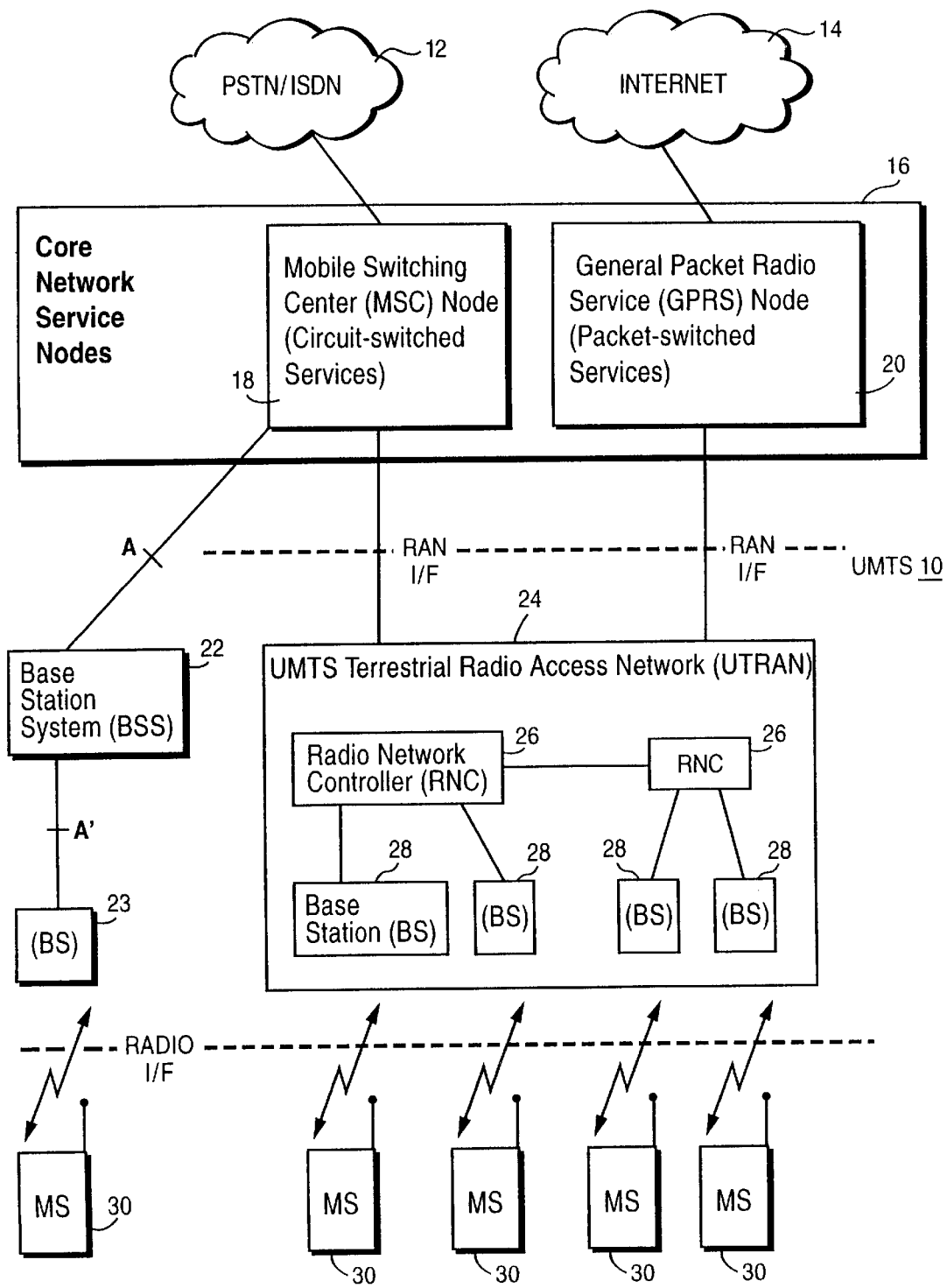
FIG. 1 is a block diagram showing a Universal Mobile Telecommunications System (UMTS)

The present invention is described in the context of a universal mobile telecommunications system (UMTS) 10 shown in FIG. 1. A representative, connection-oriented, external core network, shown as a cloud 12, may be for example the Public Switched Telephone Network (PSTN) and/or the Integrated Services Digital Network (ISDN). A representative, connectionless-oriented, external core network, shown as a cloud 14, may be for example the Internet. Both core networks are coupled to corresponding service nodes 16. The PSTN/ISDN connection-oriented network 12 is connected to a connection-oriented service node shown as a mobile switching center (MSC) node 18, that provides circuit-switched services. In the existing GSM model, the mobile switching center 18 is connected over an interface A to a base station system (BSS) 22 which in turn is connected to a radio base station 23 over interface A'. The Internet connectionless-oriented network 14 is connected to a General Packet Radio Service (GPRS) node 20 tailored to provide packet-switched type services. Each of the core network service nodes 18 and 20 connects to a UMTS Terrestrial Radio Access Network (UTRAN) 24 over a Radio Access Network (RAN) interface. The UTRAN 24 includes one or more radio network controllers (RNCS) 26. Each RNC 26 is connected to a plurality of base stations (BS) 28 and to any other RNCs in the UTRAN 24. Radio communications between the base stations 28 and mobile radio stations (MS) 30 are by way of a radio interface.

In the preferred embodiment, radio access is based on Wideband-CDMA (WCDMA) with individual radio channels allocated using WCDMA spreading codes. As described in the background, WCDMA provides the wide bandwidth for multimedia services and other high rate demands as well as robust features like diversity handoff and RAKE receivers to ensure high quality.

The RAN interface is an "open" interface between the GSM-based service nodes 18 and 20 which provide services to/from mobile radios over the radio interface to the external core networks 12 and 14 (and ultimately to external, core network end users) without having to request specific radio resources necessary to provide those services. The RAN interface essentially hides those details from the service nodes, external networks, and users. Instead, logical radio access bearers are simply requested, established, maintained, and released at the RAN interface by the service nodes. As explained in the summary, a radio access bearer is a logical connection between an external core network support node and a mobile station through the UTRAN. It is the task of the UTRAN 24 to map radio access bearers onto physical transport channels in a flexible, efficient, and optimal manner. The mapping includes selecting channel parameters based on quality of service parameters that accompany the radio access bearer request. Example parameters include transport and radio channel type (common or dedicated), retransmission protocol (RLC) parameters, selection of encoding and interleaving (MAC and physical layer) parameters, selection of radio access bearer multiplexing options, (i.e., which radio access bearers will be multiplexed with each other and at which level), and selection of CDMA code(s) and bit rate(s). The radio network controller (RNC) 26 is responsible for the radio access bearer service.

Significant advantages are achieved using a radio access bearer service architecture and approach. Instead of the external core networks and/or service nodes having to request specific radio resources and getting involved in the allocation and control of radio resources, (which can be quite involved for WCDMA calls—especially for multimedia calls), the service nodes simply transmit a request for one or more radio access bearers in order to obtain access to a particular mobile station. The RAN interface and the UTRAN 24 handle the radio access bearer request and perform the necessary allocation, control, release, and other management tasks for transport and radio resources.

In the preferred example embodiment, the UTRAN employs ATM-type transport and WCDMA radio access resources. While ATM and WCDMA are wideband, flexible, and robust, they are also fairly complicated communication resources to manage. Advantageously, the service nodes are isolated from this complexity. Each service node only requests one (or more) radio access bearer(s) specifying the identity of the mobile to be communicated with one or more quality of service parameters to be associated with that bearer. Quality of service may include a desired bit rate, an amount of delay before information is transferred, a minimum bit error rate, etc. Thus, from the standpoint of a core network node, a radio access bearer or UTRAN connection is simply a logical data flow or "pipe" from the service node through the UTRAN 24 to the desired mobile station 30 the details of which are not important to and are hidden from the core network service node.

The RAN interface therefore permits the use of relatively simple, high level signaling commands to establish, maintain, and release radio access bearers through the UTRAN 24. A service from the core network service node is requested using a signaling connection between the mobile station and the core network service node. The signaling connection may be set up in response to a page from the core network, activation of a service in the mobile station, or by some other procedure, e.g., a location update. After the signaling connection is set up and the services requested by the core network and mobile station are sent over the signaling connection, the RNC assigns an ATM transport connection through the UTRAN and a WCDMA radio channel over the radio interface to establish an end-to-end connection between the MS and the core network end user. The RNC also releases radio access bearers when a call is terminated.

The RNC further coordinates multiple radio access bearers to one mobile terminal which may include mapping multiple radio access bearers onto a single radio channel. In the WCDMA preferred embodiment, this includes assigning multiple bearer connections to a specific CDMA spreading code (a radio channel). Moreover, radio access bearers from both of the core network service nodes 18 and 20 may be mapped onto the same CDMA channel to the same mobile station by the RNC.

The RNC supervises establishing and releasing of ATM transport connections and radio channels and performs higher level supervisory types of radio control operations such as diversity handoff or scheduling of packet data. The base station handles the WCDMA radio interface to the mobile station and includes the radio equipment such as transceivers, digital signal processors, and antennas needed to serve each cell in the network.

As an interface to the core network, the RNC selects the particular quality of radio access bearer service for the radio access bearer along with other features such as for example a link layer protocol, e.g., radio link control (RLC) retransmission protocol, a vocoder with a specific bit rate, etc. In addition, the transport through the UTRAN such as a dedicated ATM connection, and whether the radio access bearer will be multiplexed with other radio access bearers on an existing ATM connection is also controlled. The RNC aggregates the new RAN bearer services for all radio access bearers for each mobile station, and selects the transport connection and radio channel type to be employed based on the aggregated UTRAN bearer services for a mobile station. Radio channel types include common channels which may be shared by more than one mobile station during the connection, and dedicated channels which may only be used by a single mobile station during the connection. Still further, the RNC handles other radio related aspects of a radio connection like the mobility of a radio connection, e.g., handover and control signaling between the mobile station cell and core networks. The RNC also monitors the availability of radio resources, cell interference, and congestion levels.

Figure 2:
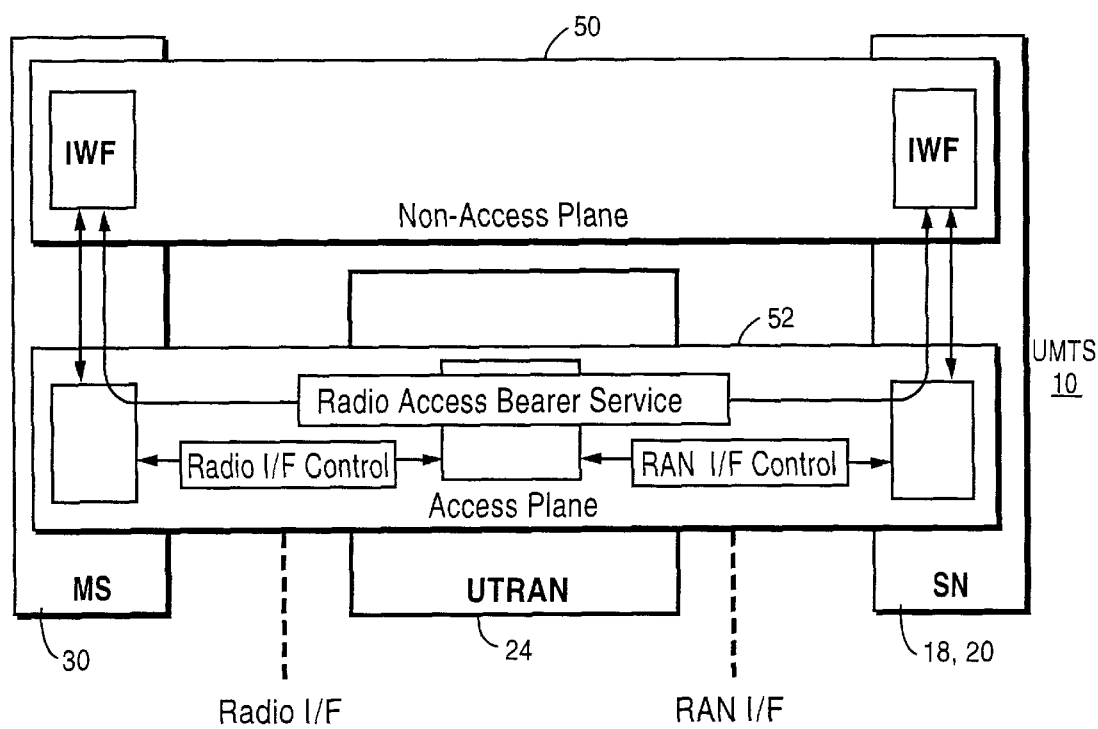
FIG. 2 is a diagram illustrating a radio access bearer service defined in terms of an access plane and a non-access plane for the UMTS of FIG. 1.

FIG. 2 illustrates the logical architecture and approach of the UMTS 10 of FIG. 1 in accordance with the present invention. In particular, the logical network of the UMTS 10 includes a non-access plane 50 and an access plane 52. The nonaccess and access planes are logical elements that do not correspond to physical nodes. The access plane 52 contains all of the radio access and radio specific functionality. In that way, if a different radio access scheme is used, e.g., something other than WCDMA and ATM, or the access scheme is modified, its impact on the UMTS is restricted to the access plane 52 and does not impact the non-access plane 50. The radio interface and the radio access network interface from FIG. 1 are included in the access plane 52.

Isolated from the radio access specific details confined to the access plane 52, the non-access plane 50 includes only logical control connections or logical traffic connections corresponding to each radio access bearer between a mobile station 30 and a core network 18 or 20. All signaling relating to call control, mobility management, supplementary services, short message service, etc. is "transparently" performed (from the perspective of non-access plane 50) through the access plane 52 and over the RAN-CN interface using the mobile station-core network signaling connection. Service access points shown by the arrow connections that link the access plane 52 and the non-access plane 50 in both the service node (SN) and the mobile station (MS) define the radio access bearer services provided by the access plane 52 to the non-access plane 50. The radio access bearer services are requested by the non-access plane 50 using one and preferably plural quality of service parameters. The UTRAN 24 includes both user data flows, represented by the radio access bearer service block, as well as a radio interface control toward the mobile station 30 and an RAN interface control toward the core network. An optional interworking function (IWF) is shown assuming that the core network service nodes 18 and 20 are GSM nodes. The interworking function adapts the GSM-based interfaces to the UMTS radio interface and the RAN interface, i.e., the IWF performs mapping between the RAN-CN interface and the existing GSM A interface.

Figure 3:
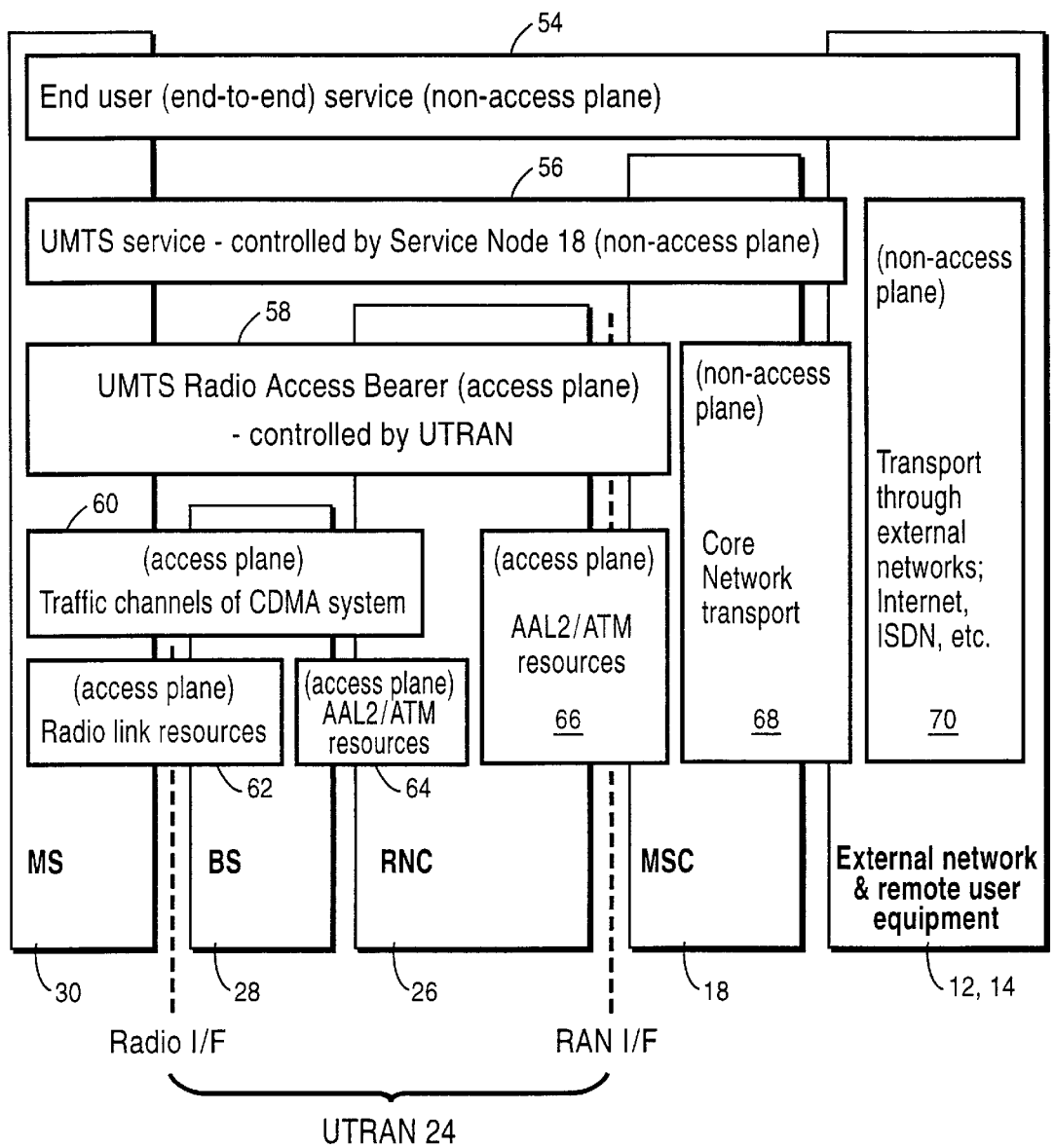
FIG. 3 illustrates the logical architecture of the non-access and access planes shown in FIG. 2.

FIG. 3 illustrates in greater detail the functionality of the non-access plane 50 and access plane 52. The non-access plane 50 includes an end user (end-to-end) service 54. In other words, this is the logical "connection" between an external user or server connected to an external core network with mobile station 30. Block 70 illustrates the functions of transporting information through the external networks to the external network user. Thus, block 54 shows that the end users of the service are isolated from the particulars of how that service is provided.

Block 56 represents the UMTS service which uses a transport service 68 between the service node (in this example the MSC 18) and the core networks together with the radio access bearer service provided by UTRAN 24 which includes the RAN interface, the RNC 26, the BS 28, and the radio interface. Blocks 54, 56, 68, and 70 correspond to logical functions/services attributable to the non-access plane 50.

The access plane 52 includes the logical functionality and services represented by blocks 58, 60, 62, 64, and 66. The UMTS radio access bearer service provides a transport connection service through the UTRAN 24 which preferably is based on Asynchronous Transfer Mode (ATM) via blocks 64 and 66. WCDMA radio traffic channels are allocated by the controllers in the RNC 26 and physically implemented by base station 28 over the radio interface to the mobile station 30 as indicated in block 60. Block 62 represents the actual radio link resources which in a WCDMA system correspond to individual CDMA spreading codes.

The UTRAN 24 provides radio access bearers that are independent of the user services, and a radio access bearer service is provided to the service node rather than to an end user. Moreover, the radio access bearers are logically separated from the physical transport media through the UTRAN 24 and over the radio interface, i.e., there is no predetermined mapping of radio access bearers to specific transport connections and radio channels. This separation allows flexible and efficient mapping of radio access bearers to specific transport connections and to different types of radio channels by the UTRAN 24.

The access plane 52 controlled by UTRAN 24 provides radio access bearers for different traffic classes. Each traffic class is defined by quality of service and/or traffic parameters that specify a particular radio access capability. Using different traffic classes permits a wide range of services to be provided, e.g., from a best effort, unspecified bit rate service to a guaranteed constant bit rate service. For communications between an end user connected to an external network and a mobile station, radio access bearers having different capabilities may be requested for uplink and downlink connections by specifying different uplink and downlink quality of service and/or traffic parameters. In this way, "asymmetric" radio access bearers are provided in the sense that one bearer uplink may transport very little data and requires only a low quality of service, while one or more downlink bearers transport enormous amounts of multimedia data requiring high quality of service.

Figure 4:
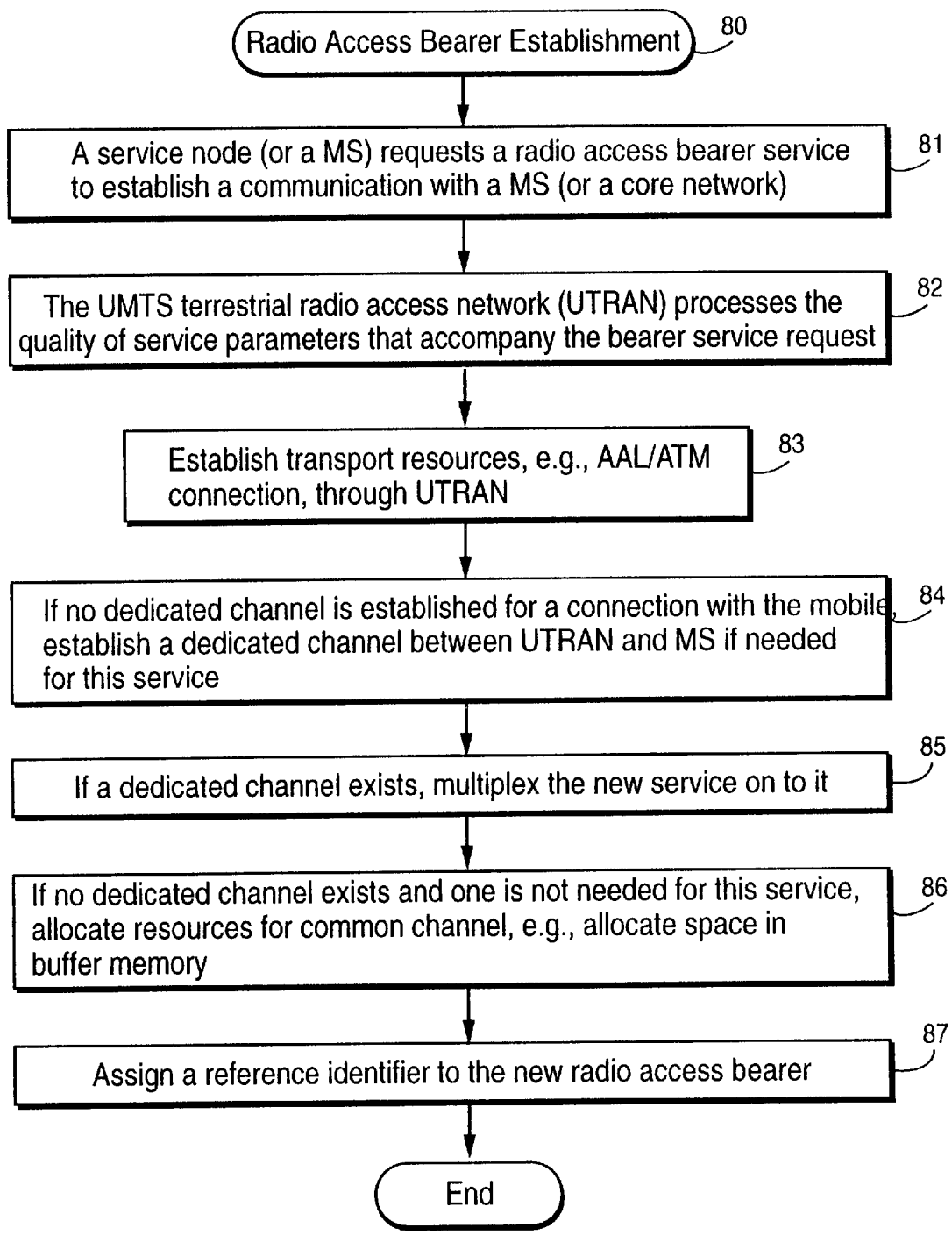
FIG. 4 is a flowchart diagram illustrating a radio access bearer establishment service routine.

FIG. 4 is a flowchart diagram the illustrates a radio access bearer establishment routine (block 80). A core network service node requests a radio bearer access service (in the non-access plane 50) over the RAN interface to the UTRAN 24 to establish a connection with the mobile station (block 81). The UTRAN 24 receives and processes the service request which includes quality of service parameters (block 82). The transport resources such as one or more AAL/ATM connections are established through the UTRAN to support the connection with the mobile station (block 83). If a dedicated channel is not currently established to the mobile station, a dedicated channel may be established between the UTRAN and the mobile station if appropriate for the requested radio access bearer service (block 84). However, if a dedicated radio channel already exists between the core network and the mobile station, the new radio access bearer service is multiplexed onto that existing dedicated channel to the mobile station (block 85). On the other hand, if no dedicated channel currently exists to the mobile station, and a dedicated channel is not needed or otherwise appropriate to support the requested radio access bearer service, common channel resources are allocated, e.g., allocating sufficient space in a buffer memory to handle the connection information to be transmit over the common channel (block 86). The UTRAN preferably assigns a reference identifier to the new radio access bearer (block 87) to distinguish it from other bearers which is particularly useful when plural bearers are multiplexed onto one channel.

For an example multimedia call, which may include speech, video, and data, the UTRAN 24 may establish and release three independent radio access bearers to one mobile station, one bearer for each of the speech, video, and data streams. Multiple remote, core network "users" including computer servers, telephones, videophones, etc. connect to core networks which connect to corresponding core network service nodes such as the MSC, GPRS, etc. These remote users communicate with a single mobile station where that mobile station may be running multiple different processes or applications (again generally viewed as "users"). For example, in a mobile station including a personal computer where the mobile station human operator is "surfing the Web" over the Internet, one computer application/process may be required for handling speech, one computer application/process for handling video, and one computer application/process for handling data.

It is not necessary that various radio access bearers be mapped in a one-to-one relationship to transport connections through the UTRAN or to CDMA radio channels (spreading codes). Indeed, multiple bearers corresponding to different media may be multiplexed onto a single radio channel for transmission over the radio air interface and demultiplexed as needed at either end of the UTRAN. However, each radio access bearer may be supported by its own AAL/ATM transport connection through the UTRAN even though it is multiplexed with other radio access bearers onto a single WCDMA radio channel, i.e., the same spreading code, associated with the mobile station. On the other hand, each radio access bearer may be allocated its own radio channel if appropriate.

The radio access bearer service may be organized using traffic classes. In this example embodiment, there are six traffic classes. For two of the traffic classes, a fixed amount AAL/ATM transport and WCDMA radio channel resources are allocated in a dedicated fashion to a radio access bearer. Because the resources are specifically reserved, that "amount" of resources does not change during the connection unless a channel-type switch is made during the connection as described in more detail below. For the other four traffic classes, the transport and radio resources may be dynamically allocated during the connection. In these four traffic classes, the UTRAN 24 provides a minimum quality of service, and in addition, if there are free resources, the service quality may increase. In terms of efficiency, the resources for these four traffic classes may be utilized more efficiently taking into account various traffic conditions and variations in those traffic conditions throughout the life of the connection to the mobile station.

Two traffic classes that will likely employ a dedicated radio channel include speech service and Synchronized Service (SS). Traffic classes that may employ a common or shared radio channel might include: Constant Bit Rate service (CBR), Unspecified Bit Rate service (UBR), Available Bit Rate service (ABR), and Variable Bit Rate service (VBR).

The UTRAN speech service transfers PCM speech samples between the MS and UTRAN 24, and generally provides speech compression/decompression via a CODEC. UTRAN synchronized service (SS) handles resources based on peak bit rate allocation. Peak bit rate may be dynamically changed between a predetermined number of values. Both the traffic source and the RNC may trigger a change in the current peak bit rate. The transport of frames of predefined sizes over the RAN interface is synchronized in the sense the predefined size frames corresponding to the current bit rate are transferred over the radio interface at predetermined time intervals. The synchronized service is well suited for multimedia, real-time services providing compression of speech, video, audio, and data. Both the UTRAN speech and SS are synchronized with the radio interface.

The CBR service provides a guaranteed peak-allocated bit rate, and AAL/ATM transport and radio channel resources are allocated on a peak bit rate basis. The UTRAN CBR service can be used to transport circuit-switched data including HSCSD as well as packet-switched data to achieve a higher quality of service.

The UBR service is a best effort delivery service and uses free bandwidth when available. If there are no AAL/ATM transport and radio channel resources currently available, the information to be transported is queued. If the queue overflows, the overflowed frames are lost. Typically, the UBR service supports packet-switched type data, and in some instances, this traffic class can be used for a short messaging service.

The ABR service allocates AAL/ATM transport and radio channel resources for sending information at a guaranteed minimum bit rate but higher bit rates are used on a best effort basis when free bandwidth is available. The UTRAN ABR service may be used for both packet-switched data (with quality of service additions) as well as for circuit-switched data if flow control is supported by the service node. The VBR service provides a variable bit rate based on statistical traffic parameters using average throughput/sustainable bit rate and a frame loss ratio as controlling parameters. The UTRAN VBR may be used for similar services as UTRAN ABR.

The radio access bearer parameters can be divided into categories such as traffic parameters, quality of service parameters, information parameters, and content parameters. The traffic parameters include peak bit rate (BR), sustainable bit rate (SBR), minimum bit rate (MBR), maximum burst size (MBS), and frame size. The PBR is the maximum instantaneous bit rate in a particular connection with a maximum burst size. The SBR is the upper bound on the average bit rate of the connection. The MBR is simply a parameter used when requesting a UTRAN ABR type of radio access bearer. The MBR provides an estimate of a maximum size of data burst that may be transmitted at a peak bit rate. The frame size specifies minimum and maximum sizes of a Protocol Data Unit (PDU), where plural PDUs are contained in each frame. When the UTRAN synchronized service is requested, one of a predetermined number of different PDU/frame sizes is selected.

Quality of service parameters may include for example data transfer rate, bit error rate (BER), transfer delay, frame loss ratio, priority, etc. The data transfer rate defines the speed at which data is transferred over an interface per unit time. Bit error rate is the average number of bit errors for a particular unit of data received. The delay is the amount of time between receipt of a request to transmit data and actual transmission of that data. The delay may include a fixed delay component as well as a rate dependent delay component. Soft/softer handover, a feature available on dedicated channels, improves the quality of reception by compensating for multipath fading. Frame loss ratio is the number of frames lost because of errors, failed retransmissions, etc. divided by the total number of frames transmitted. Priority may be indicated for individual frames to ensure that prioritized frames receive special treatment with respect to quality of service.

Information parameters include direction, configuration, and type. In particular, direction indicates whether a connection is uplink (MS→CN) or downlink (CN→MS). Configuration indicates whether the connection is to be point-to-point, point-to-multipoint, or broadcast. Type includes control, unsynchronized, and synchronized categories. A control type defines traffic as control signaling type traffic. An unsynchronized type means that the radio access bearer is not synchronized to the radio interface. A synchronized type indicates that the radio access bearer is synchronized at both the radio interface and at the RAN interface.

Content parameters include single message transport, two-way transaction, and coding. The single message transport and two-way transaction parameters are used in setting up the radio access bearer. In single message transport, the data is simply transported as a connectionless message by the bearer service. In the case of two-way transaction, an additional response to the transported message is required to complete the transaction. The coding parameter indicates that a speeched coder/decoder processes user data in the UTRAN.

Figure 5:
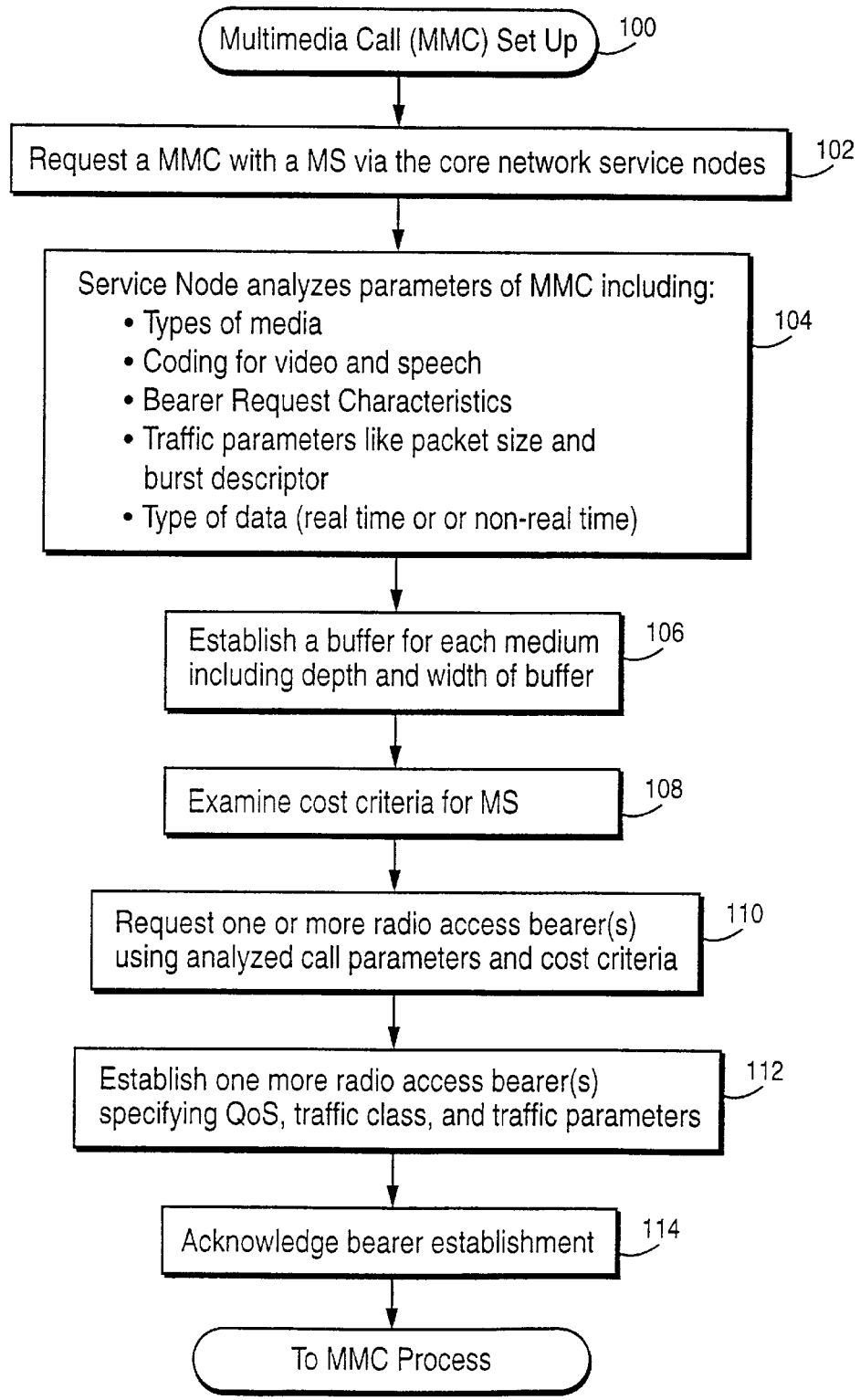
FIG. 5 is a flowchart diagram illustrating a multimedia call setup routine.

Example procedures for setting up a multimedia call (MMC) are now described in conjunction with the flowchart routine (block 100) shown in FIG. 5. This multimedia call includes speech, video, and data intended for the same mobile station. This multimedia call is requested via plural service nodes (block 102) with each service node analyzing the types of parameters involved for the call including the types of media, any coding for video and speech, bearer request characteristics such as traffic class, and one or more traffic parameters including quality of service. Also analyzed are other parameters like packet size, burst descriptor, and type of data (real time or non-real). For example, speech is real time data, while Internet data is non-real time (block 104). The service node establishes a buffer for each medium involved in the multimedia call including the depth and the width of each buffer (block 106). Using the analyzed call parameters and cost factor(s) (e.g., in terms of UTRAN resources required, interference caused, etc.) for this multimedia call, the service node requests one or more radio access bearers from the UTRAN (block 110). The radio access bearer request from the service node to the UTRAN specifies a quality of service, traffic class, and traffic parameters. From those specifications, the radio access bearer controller 32 establishes one or more radio access bearers for connection to the mobile station (block 112). The mobile station acknowledges the bearer establishment (block 114), and the multimedia call proceeds.

Accordingly, the UTRAN provides core networks and their respective service nodes with a flexible set of radio access bearer services described with quality of service parameters such as bit rate, delay, bit error rate, etc. that "carry" circuit-switched and packet-switched information to a mobile station. UTRAN manages multiple bearers related to one mobile station terminal even if they come from different core networks. In mapping radio access bearers onto specific radio channels, the UTRAN flexibly balances and attempts to optimize a number of parameters including quality of service, range (distance to base station), traffic load/capacity/conditions, mobile station transmission power, etc. The UTRAN thus provides one set of radio channels of different types to carry both circuit-switched and packet-switched information. A single radio channel can carry simultaneously packet-switched and circuit-switched information to a mobile station. As mentioned above, the two different types of radio channels which may be selected by the RNC differ by the degree of reservation with more resources being reserved for dedicated channels than common channels.

Figure 6:
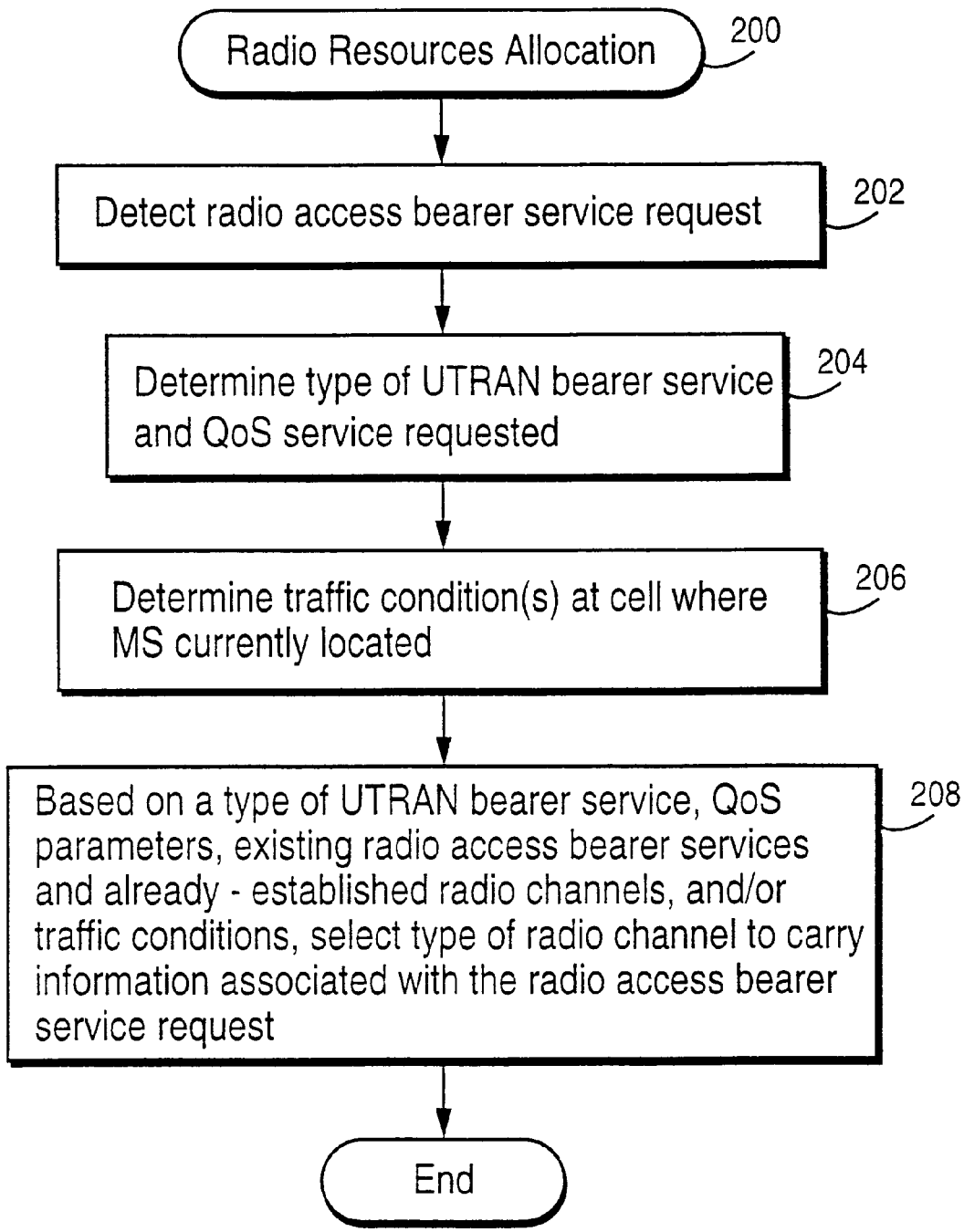
FIG. 6 is a flowchart diagram illustrating a radio resources allocation routine.

FIG. 6 shows a radio resource allocation routine (block 200) for flexible mapping of bearer services onto different channel types. The RNC detects a radio access bearer service request from a service node (block 202), and determines the type of radio access bearer service and the quality of service parameter(s) requested for that bearer service (block 204). The RNC determines one or more traffic conditions at the cell or cells where the mobile station to be involved in the connection is currently located (block 206). Based on the quality of service parameter(s) and traffic condition(s) determined, the radio resource controller 36 selects the type of channel to carry information associated with the radio access bearer service request (block 208).

For example, if high quality of service guarantees are required, then the RNC may map the bearer information onto a dedicated radio channel to achieve a frame streaming type of transport. In a WCDMA type radio access interface, a dedicated channel supports diversity handover (including "soft" and "softer" handover) and fast power control—both of which are important factors in wideband CDMA communications as well as in efficient transfer of a continuous stream of data or a large bulk data transfer. The bearer information may be mapped onto a dedicated channel to support either or both of these features. For packet type data, it may also be desirable to map frequent or large packets to a dedicated channel as may well be the case for some high intensity data transmissions. On the other hand, for infrequent or small packets, the RNC may map the radio access bearer information onto a packet-based, common access channel for scheduled transport.

Dedicated channels therefore support special services such as soft handoff over multiple cells and offer a frame streaming service where different parallel bearers may be time multiplexed or code multiplexed on the same dedicated WCDMA code channel. The UTRAN treats multiple bearers (which correspond to different services) as one radio connection, and as a result, all of the services receive the same soft handoff or fast power control operations. On the other hand, a dedicated channel may use radio resources inefficiently because the channel remains dedicated even when no information is being sent. Packet-based, common access channels offer packet oriented transport services that can be either connection-oriented or connectionless which may be scheduled packets and low level retransmissions. Scheduling permits more efficient use of the radio channel resources.

Speech and synchronized data will usually be mapped to a dedicated channel. Packet data may be sent either on a dedicated channel for frame streaming transport or on a single cell, packet-access channel using the scheduled transport. The particular type of channel to use for packet data is determined based on the quality of service requested and on other traffic factors like the traffic intensity of the geographical area or cell in which the mobile station is located. When the number of packets or the rate at which the packets need to be transferred is relatively low, a common channel is generally used; whereas for high packet intensity or strict real time requirements (no delay), a dedicated channel with soft handoff support is employed. On the other hand, if a dedicated channel connection is already established between the mobile station and the UTRAN, e.g., for speech service, then packet data is transferred over that existing dedicated channel connection rather than transferred over a common channel.

As mentioned earlier, the preferred example embodiment is based upon ATM transport and WCDMA radio channels. A connection from a service node to the mobile station may be handled at a radio link layer which may be divided into two sub-layers: a logical link layer and a radio link control (RLC)/media access control (MAC) layer. At the logical link layer, the physical transport and channel resources are allocated including selection of the appropriate type of radio channel to carry information from a particular radio access bearer over the air interface to the mobile station. The RLC/MAC layer performs various lower level communication functions like assembling frames for delivery over a CDMA radio channel.

Figure 7:
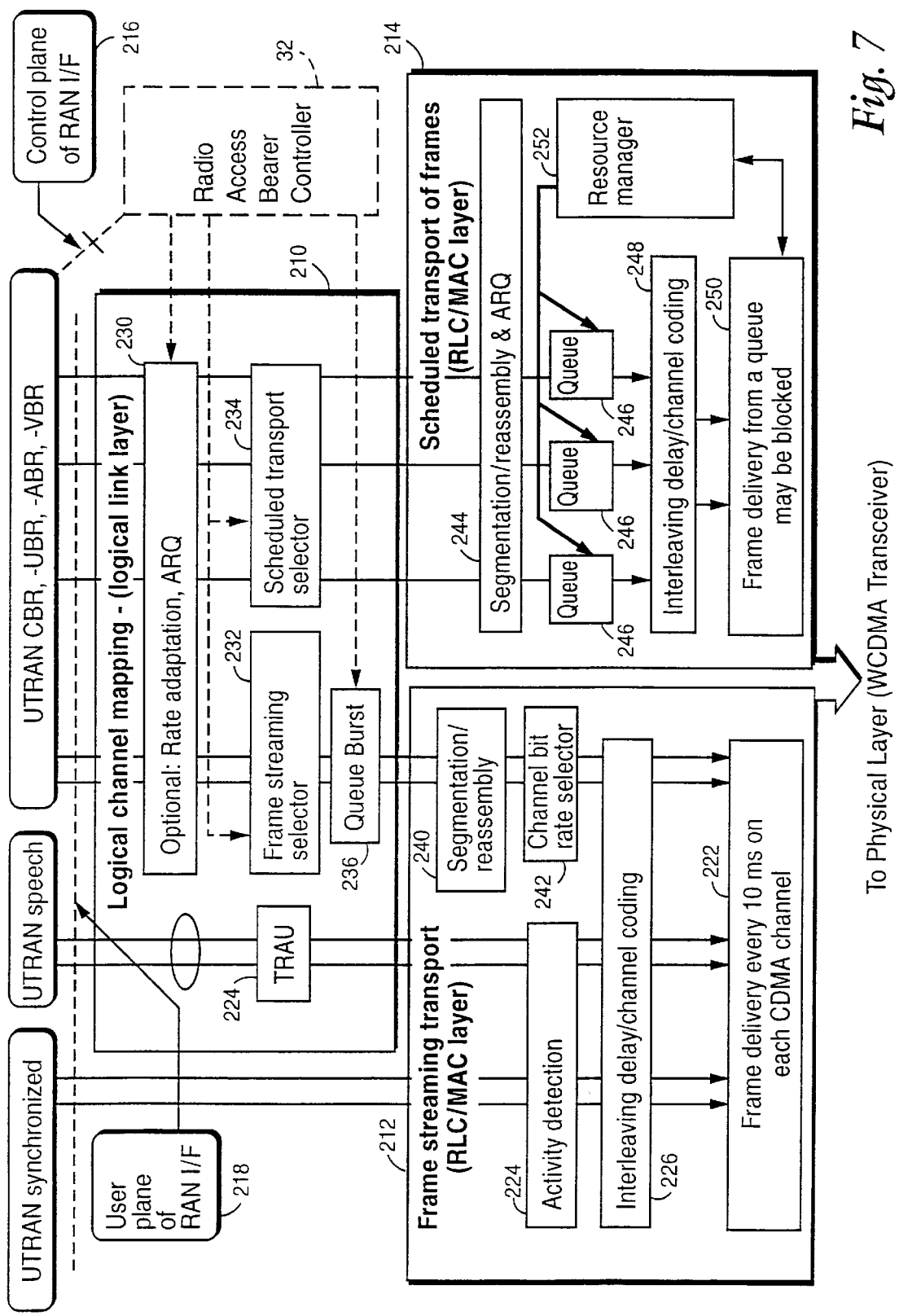
FIG. 7 is a function block diagram illustrating an example embodiment of flexible mapping of different radio access bearers to different types of physical radio channels.

FIG. 7 is a function block diagram illustrating a non-limiting example of how various radio access bearers may be mapped at the logical link layer and/or RLC/MAC layers onto WCDMA radio channels. The RAN protocol stack includes a logical channel mapping block 210 (logical link layer), a frame streaming transport block 212 (RLC/MAC layer), and a scheduled transport block 214 (RLC/MAC layer) which provide frames to the physical layer corresponding to CDMA code channels.

The radio access bearer layer exists in a control plane of the RAN interface indicated at block 216. The control plane is where requests are made for bearer services and is shown connected to the various bearer services divided by traffic class including UTRAN speech, UTRAN CBR, UBR, ABR, and VBR, which are connected to a radio access bearer controller 32 in the RNC. In the user plane of the RAN interface is indicated by block 218.

If a UTRAN synchronized service is requested over the control plane of the RAN interface 216, the bearer information is provided directly to the frame streaming transport block 212 which includes a frame delivery block 222 delivering frames, for example, every 10 milliseconds, for a WCDMA radio channel. If the bearer request contains UTRAN speech, that speech is processed in a transcoder (TRAU) 224 which converts, for example, 64 kilobit per second (kbps) speech coming from the core network into a compressed data rate appropriate for delivery over the radio interface such as 12 kbps. Both a UTRAN synchronized service connection and a UTRAN speech connection are processed in an activity detection block 224 so that silence is not transmitted over the radio interface wasting radio resources and causing unnecessary interference. Actual information for transfer is then provided to an interleaving delay and channel coding block 226 that formats the data into frames and codes the data to provide forward error correction. The framed and coded information is transmitted by the frame delivery block 222 using wideband CDMA radio transmission equipment and procedures over a WCDMA channel.

Thus, for both UTRAN synchronized and UTRAN speech services, a dedicated channel with frame streaming transport is usually selected predominantly because these two bearer services do not tolerate delays in transmission which are usually a part of the scheduled transport service. On the other hand, for the other packet-oriented radio access bearer services in traffic classes CBR, UBR, ABR, and VBR, the radio access bearer controller 32 may select either a dedicated channel with frame streaming or a common channel with scheduled transport based on the current quality of service requested and traffic conditions. The logical channel mapping block 210 may include an optional rate adaptation function to manage data bursts having infrequent but higher data rates. Rate adaptation may be performed using leaky bucket control, flow control, padding, discarding of frames at buffer overflow, etc. The rate adaptation function may also include retransmission of packets (ARQ), although this retransmission function may also be provided in the core network or in the RLC/MAC layer.

The radio access bearer controller 32 controls the dedicated channel, frame streaming selector 232 and the common channel, scheduled transport selector 234 based upon a number of factors some of were noted above. If the common channel type transport is selected by the radio access bearer controller 32, e.g., for a "bursty" service for the UBR, ABR, or VBR traffic classes, (CBR is constant bit rate and therefore is not bursty), burst queues 236 are provided to make it possible to allocate a lower frame streaming peak bit rate than the peak bit rate received over the RAN interface which is likely to be higher than the frame streaming bit rate for the traffic classes UBR, ABR, or VBR.

If the dedicated channel, frame streaming selector 232 is activated to carry CBR, UBR, ABR, or VBR data packets, the radio resources are allocated at a predetermined rate and with a constant delay making frame streaming appropriate for speech and other real time services. Data is delivered in sequence on the selected radio channel, and the segmentation/reassembly block 240 divides the information into packets frames in block 240. An channel bit rate selector 242, like the activity detection block 224, controls the bit rate of the bit stream and also makes sure that "silence" is not transmitted over the radio interface. The segmented data is processed in the interleaving delay/channel coding block 224 and passed on to the frame delivery block 222. Frames are transmitted over the radio interface without further delay. The bit rate allocation for the frame streaming transport is on a peak bit rate basis.

If the scheduled transport selector 234 is activated, the connection data are routed to the scheduled transport block 214 which provides a common channel well-suited for many types of non-real time services. However, features like soft handoff and fast power control are not supported. Radio resources are allocated at a lower bit rate than the peak bit rate. Traffic channels with a predefined target quality of service or a best effort characteristic are both provided. The transfer delay may vary from frame to frame. Segmentation/reassembly and automatic retransmission 224 are performed from the scheduled transport selector 234. The segmentation/reassembly function in block 244 is used to adapt the data streams to the appropriate frame size used over the radio interface.

In scheduled transport, the frames are queued in one of the queues 246 controlled by a resource manager 252. One queue 246 may be used for each established radio access bearer. The resource manager 252 controls the queues 246 to deliver frames via the interleaving delay/channel coding block 248 and frame delivery block 250 so that the total interference level is minimized. In an example where a data burst occurs at the same time on two radio access bearers, the resource manager 252 schedules the transport from the two corresponding radio access bearer queues 246 to prevent a significant data surge on the radio interface.

Figure 8:
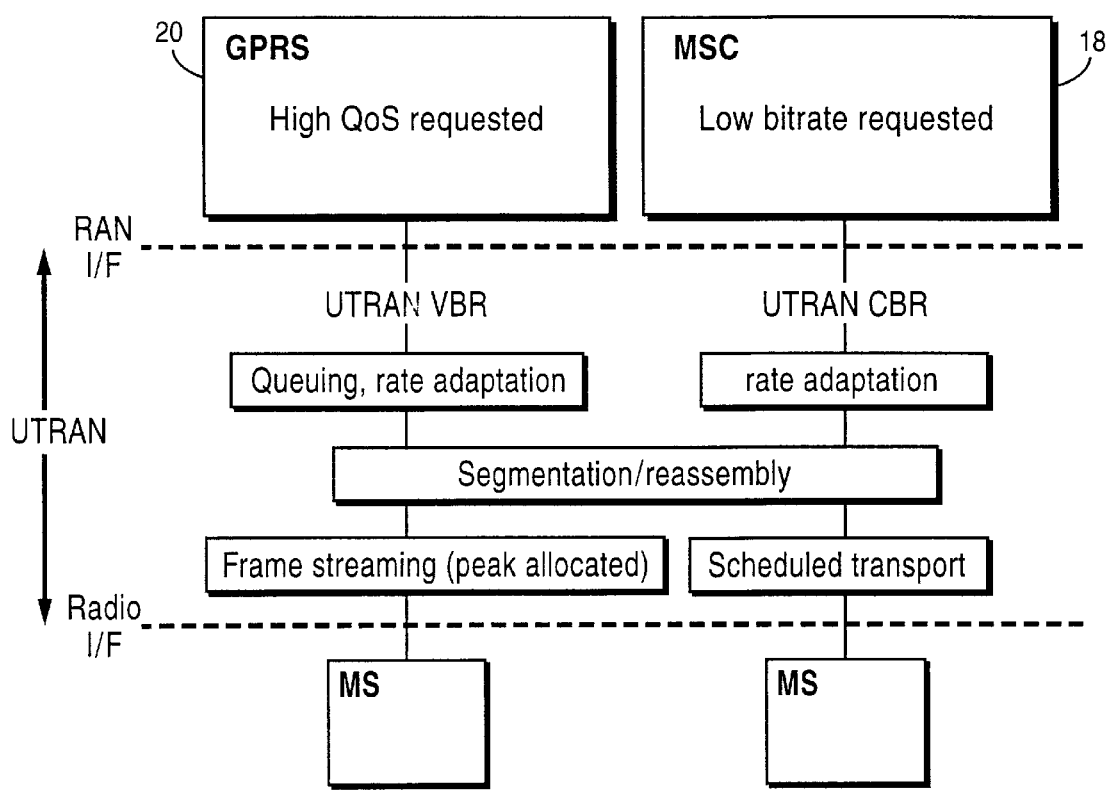
FIG. 8 is a flowchart diagram illustrating a dedicated channel/frame streaming versus common channel/scheduled transport routine.

FIG. 8 illustrates a simple example of mapping different types of connections to different types of radio channels. From the GPRS service node 20, a radio access bearer requesting a high quality service for a UTRAN variable bit rate access bearer is transmitted over the RAN interface. On the other hand, the MSC service node 18, at or about the same time, requests a relatively low quality, low bit rate, UTRAN constant bit rate access bearer request for a circuit switched data service. The flexible mapping of these two bearers onto different types of radio resource channels in the UTRAN allows the high quality and demanding GPRS service, even though for packetized data, to be mapped to a dedicated channel to take advantage of features provided by the frame streaming transport service. On the other hand, relatively "expensive" dedicated channel resources are not "wasted" for a relatively low quality, low bit rate packet data service which is adequately and efficiently delivered using the scheduled transport of a common channel.

Figure 9:
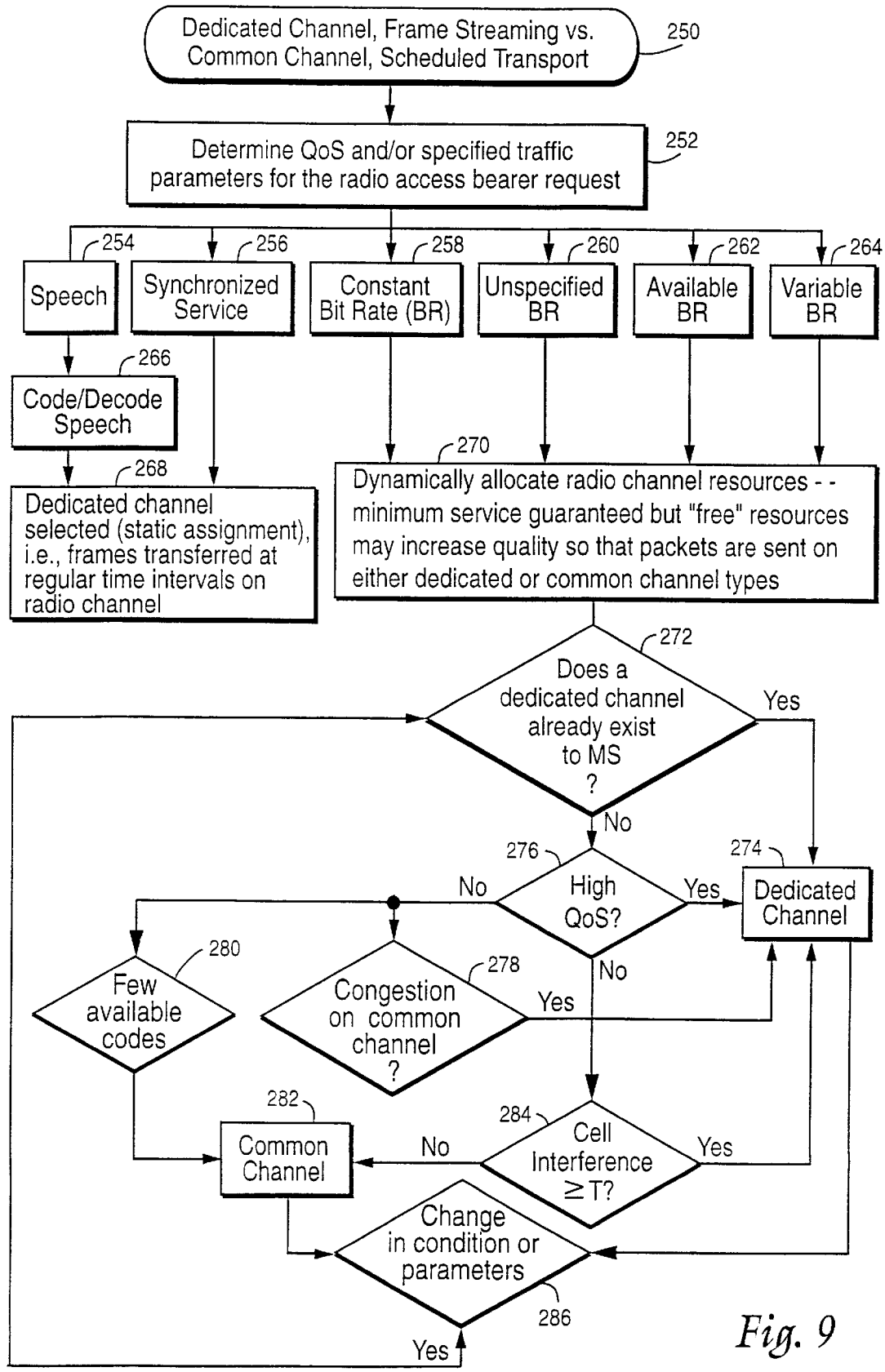
FIG. 9 is a block diagram illustrating a simple example of a flexible mapping different radio access bearers to different types of radio channels.

Reference is now made to the flowchart shown in FIG. 9 which illustrates a dedicated channel with frame streaming transport versus a common channel with scheduled transport selection routine (block 250). Initially, quality of service and/or other specified traffic parameters associated with a radio access bearer are determined and appropriate radio access bearer service(s) identified (block 252). Blocks 254-264 illustrate several types of UTRAN radio access bearer services including: speech (block 254), synchronized service (block 256), constant bit rate (CBR) (block 258), unspecified bit rate (UBR) (block 260), available bit rate (ABR) (block 262), and variable bit rate (VBR) (block 264). For the speech and synchronized services which require a low delay service, a dedicated channel is typically selected (block 268) so that the frames are transferred over the radio interface at regular time intervals on a radio channel, i.e., frame streaming. As indicated in block 266, the speech is coded/decoded to convert between the core network bit rate and the lower radio interface bit rate.

For the CBR, UBR, ABR, and VBR UTRAN services, the efficient types of radio channel resources, common and dedicated, are allocated to support a radio access bearer service based on quality of service parameters and/or on current traffic conditions so that data packets may be sent either on a dedicated or a common type of channel (block 270). A minimum bit rate service is guaranteed with the additional option of increasing that minimum service thereby increasing quality if additional radio channel resources become available. A decision is made (block 272) whether a dedicated channel already exists for the particular mobile station. If so, the data associated with the new radio access bearer is multiplexed onto that dedicated channel since this is more efficient than establishing a new scheduled transport connection (block 274). Moreover, control signaling associated with the new radio access bearer may also be multiplexed onto that dedicated channel for the same reason.

If there is no existing dedicated channel for that mobile station, a decision is made (block 276) whether the radio access bearer request requires a high quality of service such as a high guaranteed bit rate, minimal or no delay, etc. If so, a dedicated channel may be selected (block 274) to provide such high quality of service. If a high quality of service is not required, a common channel may be selected. However, one or more other parameters and/or conditions may also be factored into the channel type decision. A decision is made (block 278) whether there is congestion on the common channel, e.g., compared to a threshold. If so, a dedicated channel is selected (block 274). If not, a common channel may be selected (block 282). Another decision may be made in block 280 whether only a few spreading codes remain available for dedicated channels (block 280). If this is the case, a common channel is selected. Yet another decision may be made in block 284 whether the current interference level is greater than or equal to a predetermined threshold T (block 284). If not, a more efficient common channel may be selected. However, for high interference situations, a dedicated channel may be selected because transmit power control is provided for dedicated radio channels.

During the life of the connection to the mobile station, a decision may be made periodically or continuously in block 286 whether there has been a change in a condition or parameter with respect to the radio access bearer sufficient to warrant a reassessment of whether the current type of radio channel is desirable or otherwise appropriate (block 286). One or more of the procedures indicated in blocks 272-284 may then be repeated, and if appropriate, and as a result, the type of channel which supports that radio access bearer may be changed during the connection. For example, the type of data to be sent might change over the connection, the interference level may have changed, etc.

Thus, the functional separation between the radio access bearer service and the CDMA radio transport mechanism allows flexible initial selection and subsequent changing of the type of physical radio channel ultimately used to convey the information associated with a radio access bearer supporting a connection to a mobile station.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. For use in a universal mobile telephone system (UMTS) providing communications with mobile radios, a radio access network (RAN) comprising:
   plural base stations for communicating with mobile radios over an air interface using allocated radio resources, and
   a radio network controller coupled to the plural base stations, and
   first and second service nodes that interface with first and second external networks, respectively, connected to the radio network controller over a RAN interface, where in response to a radio access bearer request from one of the first and second service nodes, the RAN is configured to provide a radio access bearer service to the one service node including: (1) establishing a logical connection between the one service node through the RAN to the mobile radio and (2) mapping the logical connection to one of plural, different types of channels, based on a UMTS traffic parameter, and where the plural, different channel types include a dedicated channel type and a common channel type, wherein the UMTS traffic parameter includes an availability of dedicated channels, and the RAN is configured to map the logical connection to a common channel when the availability of dedicated channels is low.

2. For use in a universal mobile telephone system (UMTS) providing communications with mobile radios, a radio access network (RAN) comprising:

plural base stations for communicating with mobile radios over an air interface using allocated radio resources, and a radio network controller coupled to the plural base stations, and first and second service nodes that interface with first and second external networks, respectively, connected to the radio network controller over a RAN interface, where in response to a radio access bearer request from one of the first and second service nodes, the RAN is configured to provide a radio access bearer service to the one service node including: (1) establishing a logical connection between the one service node through the RAN to the mobile radio and (2) mapping the logical connection to one of plural, different types of channels, based on a UMTS traffic parameter, and where the plural, different channel types include a dedicated channel type and a common channel type, wherein the UMTS traffic parameter includes congestion on the common channel, and the RAN is configured to map the logical connection to a dedicated channel when the congestion is high on the common channel.

3. For use in a universal mobile telephone system (UMTS) providing communications with mobile radios, a radio access network (IRAN) comprising:

plural base stations for communicating with mobile radios over an air interface using allocated radio resources, and a radio network controller coupled to the plural base stations, and first and second service nodes that interface with first and second external networks, respectively, connected to the radio network controller over a RAN interface, where in response to a radio access bearer request from one of the first and second service nodes, the RAN is configured to provide a radio access bearer service to the one service node including: (1) establishing a logical connection between the one service node through the RAN to the mobile radio and (2) mapping the logical connection to one of plural, different types of channels, based on a UMTS traffic parameter, and where the plural, different channel types include a dedicated channel type and a common channel type, wherein when a dedicated channel already exists between the RAN and the mobile radio, the RAN is configured to map the logical connection to the already-existing dedicated channel.

4. For use in a universal mobile telephone system (UMTS) providing communications with mobile radios, a radio access network (RAN) comprising:

plural base stations for communicating with mobile radios over an air interface using allocated radio resources, and a radio network controller coupled to the plural base stations, and first and second service nodes that interface with first and second external networks, respectively, connected to the radio network controller over a RAN interface, where in response to a radio access bearer request from one of the first and second service nodes, the RAN is configured to provide a radio access bearer service to the one service node including: (1) establishing a logical connection between the one service node through the RAN to the mobile radio and (2) mapping the logical connection to one of plural, different types of channels, based on a UMTS traffic parameter, and where the plural, different channel types include a dedicated channel type and a common channel type, wherein the RAN is configured to map control signaling associated with the logical connection mapped to a dedicated channel to the same dedicated channel.

5. For use in a universal mobile telephone system (UMTS) providing communications with mobile radios, a radio access network (RAN) comprising:

plural base stations for communicating with mobile radios over an air interface using allocated radio resources, and a radio network controller coupled to the plural base stations, and first and second service nodes that interface with first and second external networks, respectively, connected to the radio network controller over a RAN interface, where in response to a radio access bearer request from one of the first and second service nodes, the RAN is configured to provide a radio access bearer service to the one service node including: (1) establishing a logical connection between the one service node through the RAN to the mobile radio and (2) mapping the logical connection to one of plural, different types of channels, based on a UMTS traffic parameter including a radio interference condition, and where the plural, different channel types include a dedicated channel type and a common channel type, and where the RAN is configured to map the logical connection to a dedicated channel when the radio interference is greater than or equal to a threshold and to a common channel when the radio interference is less than the threshold.

6. The RAN in claim 5, wherein a dedicated channel uses a frame streaming transfer service provided by the RAN and a common channel uses a scheduled transport service provided by the RAN.

7. The RAN in claim 5, wherein the UMTS uses code division multiple access, and wherein the dedicated channel includes a spreading code that is assigned to and used only by the mobile station during the logical connection, and the common channel includes another spreading code that is provided to and may be shared by plural mobile stations during the logical connection.

8. The RAN in claim 5, wherein the RAN is configured to map the logical connection to one of plural, different types of channels based on plural UMTS traffic parameters.

9. The RAN in claim 8, wherein if one of the UMTS traffic parameters relates to soft or softer handover, the RAN is configured to map the logical connection to a dedicated channel.

10. The RAN in claim 8, wherein one of the UMTS traffic parameters is a characteristic of the radio access service, and the RAN is configured to map a logical connection that requests a real time service to a dedicated channel.

11. The RAN in claim 8, wherein one of the UMTS traffic parameters is a characteristic of the radio access service, and the RAN is configured to map a logical connection that requests a speech service to a dedicated channel.

12. The RAN in claim 8, wherein one of the UMTS traffic parameters is a characteristic of the radio access service, and the RAN is configured to map a logical connection that requests bulk data transfer service to a dedicated channel.

13. The RAN in claim 8, wherein one of the UMTS traffic parameters is a characteristic of the radio access service, and the RAN is configured to map a logical connection that requests a synchronized service to a dedicated channel.

14. The RAN in claim 8, wherein the RAN is configured to map a logical connection that requests a high quality of service to a dedicated channel.

15. The RAN in claim 8, wherein the plural UMTS traffic parameters include plural quality of service parameters associated with the logical connection.

16. The RAN in claim 15, wherein the plural UMTS traffic parameters include a quality of service parameter associated with the logical connection and a current traffic condition.

17. The RAN in claim 5, wherein the logical connection may be configured to transport one of four traffic classes: constant bit rate traffic, unspecified bit rate traffic, available bit rate traffic, and variable bit rate traffic, and wherein the RAN is configured to map the logical connection of a channel based on a bit rate requested for one of the four traffic classes associated with the logical connection.

18. The RAN in claim 5, wherein the RAN includes:
a speech coder/decoder for coding and decoding speech frames transmitted and received over the air interface.

19. The RAN in claim 5, wherein the RAN is configured to multiplex different logical connections associated with the mobile station onto one of the dedicated channels with the RAN handling the different logical connections as one channel.

20. In a universal mobile telephone system that provides multimedia communications with mobile radios including a radio access network (RAN) having plural base stations coupled to a radio network controller for communicating over an air interface with mobile radios using allocated channel resources and a service node coupled to the RAN, a method comprising:
providing a RAN interface between the RAN and the service node;
setting up a logical connection between the service node and one of the mobile radios in response to a request to the RAN for a radio access bearer service;
establishing a transport path for the logical connection through the RAN; and
mapping the logical connection to one of plural different types of radio channels, including a dedicated radio channel type and a common radio channel type, based on a quality of service parameter associated with the logical connection and a traffic condition monitored in the RAN.

21. The method in claim 20, wherein the traffic condition includes an interference value at a cell in which the mobile station is currently located such that for a high interference level, the logical connection is mapped to a dedicated radio channel.

22. The method in claim 20, wherein if the quality of service includes a speech service, the logical connection is mapped to a dedicated radio channel.

23. The method in claim 20, wherein if the quality of service includes a synchronized service, the logical connection is mapped to a dedicated channel.

24. The method in claim 20, wherein if the quality of service tolerates delay and an interference level in a cell where the mobile radio is currently located is below a threshold, the logical connection is mapped to the common radio channel.

25. The method in claim 20, wherein if the quality of service tolerates delay and a congestion level on the common channel is below a threshold, the logical connection is mapped to the common radio channel.

26. The method in claim 20, wherein if the quality of service tolerates delay and a number of available dedicated radio channels is below a threshold, the logical connection is mapped to the common radio channel.

27. The method in claim 20, further comprising:
determining if a dedicated channel currently exists for the mobile radio, and
if so, mapping the logical connection to the same dedicated radio channel.

28. The method in claim 20, further comprising:
determining if a dedicated channel currently exists for the mobile radio, and
if so, mapping a signaling connection associated with the logical connection to the same dedicated radio channel.

29. The method in claim 20, wherein the quality of service parameter is soft or softer handover, and the radio channel is a dedicated channel.

30. In a universal mobile telephone system that provides multimedia communications with mobile radios including a radio access network (RAN) having plural base stations coupled to a radio network controller for communicating over an air interface with mobile radios using allocated channel resources and a service node coupled to the RAN, a method comprising:
providing a RAN interface between the RAN and the service node;
setting up a logical connection between the service node and one of the mobile radios in response to a request to the RAN for a radio access bearer service;
establishing a transport path for the logical connection through the RAN; and
mapping the logical connection to one of plural different types of radio channels, including a dedicated radio channel type and a common radio channel type, based on a quality of service parameter associated with the logical connection and a traffic condition monitored in the RAN,
detecting a change in the quality of service parameter associated with the logical connection or in the traffic condition in the RAN, and
switching the type of radio channel associated with the logical connection based on the detected change.

31. The method in claim 20, wherein the parameter includes data traffic intensity.

32. The method in claim 20, wherein the dedicated radio channel delivers frames of information as received without substantial delay, and the common radio channel delivers frames of information in a scheduled manner.

33. The method in claim 30, wherein the data traffic intensity parameter is determined using the interference level in a geographic location area in which the mobile radio is currently operating.

34. The method in claim 30, further comprising:
determining another parameter associated with the radio access service request,
wherein the parameter is the quality of service associated with the radio access service request.

35. The method in claim 30, further comprising:
determining another parameter associated with the radio access service request,
wherein the parameter is a current level of congestion on the common radio channel.

36. The method in claim 30, further comprising:
determining another parameter associated with the radio access service request,
wherein the parameter includes plural parameters.

37. The method in claim 30, further comprising:
determining another parameter associated with the radio access service request,
wherein the parameter is a current availability of dedicated radio channels.

38. The method in claim 30, wherein a common radio channel is initially established for the connection, the method further comprising:
detecting that a quality of service associated with the connection has increased, and
switching the connection to a dedicated radio channel.

39. The method in claim 30, wherein a dedicated radio channel is initially established for the connection, the method further comprising:
detecting that a quality of service associated with the connection has decreased, and
switching the connection to the common radio channel.

40. The method in claim 30, wherein a common radio channel is initially established for the connection, the method further comprising:
detecting that an interference level in a cell in which the mobile radio is located has increased, and
switching the connection to a dedicated radio channel.

41. The method in claim 30, wherein a common radio channel is initially established for the connection, the method further comprising:
detecting that a congestion level on the common radio channel has increased, and
switching the connection to a dedicated radio channel.

42. The method in claim 30, further comprising:
determining another parameter associated with the radio access service request,
wherein the parameter is the radio access service.

43. The method in claim 30, further comprising:
determining another parameter associated with the radio access service request,
wherein the parameter is the type of data to be transferred.

* * * * *